(12) United States Patent
Shin

(10) Patent No.: US 9,680,144 B2
(45) Date of Patent: Jun. 13, 2017

(54) ELECTRODE ASSEMBLY, METHOD OF FABRICATING ELECTRODE ASSEMBLY, AND SECONDARY BATTERY INCLUDING ELECTRODE ASSEMBLY

(75) Inventor: Hosik Shin, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 697 days.

(21) Appl. No.: 13/167,437

(22) Filed: Jun. 23, 2011

(65) Prior Publication Data

US 2012/0003506 A1  Jan. 5, 2012

(30) Foreign Application Priority Data

Jul. 1, 2010  (KR) .................. 10-2010-0063586

(51) Int. Cl.
*H01M 10/02* (2006.01)
*H01M 10/04* (2006.01)
(Continued)

(52) U.S. Cl.
CPC ....... *H01M 2/266* (2013.01); *H01M 10/0431* (2013.01); *H01M 10/0436* (2013.01);
(Continued)

(58) Field of Classification Search
CPC ........... H01M 10/0431; H01M 10/045; H01M 10/0459; H01M 10/0583
See application file for complete search history.

(56) References Cited

U.S. PATENT DOCUMENTS

2005/0003264 A1   1/2005 Oh et al.
2005/0058888 A1*  3/2005 Aamodt et al. ................. 429/94
(Continued)

FOREIGN PATENT DOCUMENTS

JP   05225983   9/1993
JP   06231797   8/1994
(Continued)

OTHER PUBLICATIONS

Korean Notice of Allowance issued on Sep. 14, 2012 by KIPO in connection with Korean Application No. 10-2010-0063586 and Request for Entry of the Accompanying Office Action attached herewith.

(Continued)

*Primary Examiner* — Barbara Gilliam
*Assistant Examiner* — Stephan Essex
(74) *Attorney, Agent, or Firm* — Robert E. Bushnell, Esq.

(57) ABSTRACT

An electrode assembly that includes a positive electrode assembly including a number of positive electrodes each having a positive electrode non-coating portion at a certain position, and a positive electrode tab coupling all the positive electrode non-coating portions, a negative electrode assembly including a plurality of negative electrodes each having a negative electrode non-coating portion at a certain position, and a negative electrode tab coupling all the negative electrode non-coating portions, and a separator disposed between each positive electrode and each negative electrode to insulate a region between the positive electrode and the negative electrode. The positive electrodes of the positive electrode assembly and the negative electrodes of the negative electrode assembly are stacked alternately.

12 Claims, 15 Drawing Sheets

(51) Int. Cl.
*H01M 2/18* (2006.01)
*H01M 2/26* (2006.01)
H01M 4/04 (2006.01)
H01M 10/0585 (2010.01)

(52) U.S. Cl.
CPC .... *H01M 10/0585* (2013.01); *Y10T 29/49108* (2015.01); *Y10T 29/49115* (2015.01)

(56) References Cited

U.S. PATENT DOCUMENTS

| | | |
|---|---|---|
| 2008/0280197 A1 | 11/2008 | Machida |
| 2009/0111013 A1* | 4/2009 | Jang ............................ 429/163 |
| 2009/0136844 A1 | 5/2009 | Watanabe et al. |
| 2009/0186270 A1 | 7/2009 | Harada et al. |
| 2010/0227211 A1* | 9/2010 | Chang et al. ................ 429/152 |
| 2011/0104539 A1 | 5/2011 | Oh et al. |

FOREIGN PATENT DOCUMENTS

| | | | |
|---|---|---|---|
| JP | 2010-10145 A | | 1/2010 |
| KR | 20040101652 | | 12/2004 |
| KR | 2007101567 A | * | 10/2007 |
| KR | 1020070101567 A | | 10/2007 |
| KR | 10-2009-0085879 A | | 8/2009 |
| KR | 10-2009-0085966 A | | 8/2009 |

OTHER PUBLICATIONS

Korean Office action issued by KIPO on Jan. 3, 2012, corresponding to KR 10-2010-0063586 and Request for Entry attached herewith.

* cited by examiner

ELECTRODE ASSEMBLY, METHOD OF FABRICATING ELECTRODE ASSEMBLY, AND SECONDARY BATTERY INCLUDING ELECTRODE ASSEMBLY

CLAIM OF PRIORITY

This application makes reference to, incorporates the same herein, and claims all benefits accruing under 35 U.S.C. §119 from an application earlier filed in the Korean Intellectual. Property Office on Jul. 1, 2010 and there duly assigned Serial No. 10-2010-0063586.

BACKGROUND OF THE INVENTION

Field of the Invention

The general inventive concept relates to an electrode assembly, a method of fabricating the electrode assembly, and a secondary battery including the electrode assembly.

Description of the Related Art

Recently, as electronic, communication, and computer industries are making rapid advancements, widespread use of portable electronic devices is increasing. As a power source for these portable electronic devices, rechargeable secondary batteries are generally used. Such a secondary battery includes an electrode assembly that stores and discharges electrical energy.

Since the characteristics and performances of the secondary battery depend on its electrode assembly, research and development efforts are being carried out on the electrode assembly.

The above information disclosed in this Related Art section is only for enhancement of understanding of the background of the invention and therefore it may contain information that does not form the prior art that is already known to a person of ordinary skill in the art.

SUMMARY OF THE INVENTION

An aspect of the present invention provides an electrode assembly that can be easily assembled. Another aspect of the present invention provides an electrode assembly that can facilitate aligning. Another aspect of the present invention provides a method of fabricating the electrode assembly.

Another aspect of the present invention provides a secondary battery including the electrode assembly.

According to at least one of embodiments, an electrode assembly may include: a positive electrode assembly having a plurality of positive electrodes each including a positive electrode non-coating portion at a certain position, and a positive electrode tab coupling all the positive electrode non-coating portions; a negative electrode assembly having a plurality of negative electrodes each including a negative electrode non-coating portion at a certain position, and a negative electrode tab coupling all the negative electrode non-coating portions; and a separator disposed between each positive electrode and each negative electrode to insulate a region between the positive electrode and the negative electrode, wherein the positive electrodes of the positive electrode assembly and the negative electrodes of the negative electrode assembly are stacked alternately.

According to another embodiment, a secondary battery may include: an electrode assembly; an external member receiving the electrode assembly; and a protection circuit module to which a positive electrode tab and a negative electrode tab of the electrode assembly are electrically connected, wherein the electrode assembly includes: a positive electrode assembly including a plurality of positive electrodes each having a positive electrode non-coating portion at a certain position, and the positive electrode tab coupling all the positive electrode non-coating portions; a negative electrode assembly including a plurality of negative electrodes each having a negative electrode non-coating portion at a certain position, and the negative electrode tab coupling all the negative electrode non-coating portions; and a separator disposed between each positive electrode and each negative electrode to insulate a region between the positive electrode and the negative electrode, wherein the positive electrodes of the positive electrode assembly and the negative electrodes of the negative electrode assembly are stacked alternately.

The positive electrode non-coating portions may be disposed in the middle of the positive electrode, and the negative electrode non-coating portions may be disposed in the middle of the negative electrode.

The positive electrode non-coating portions may be disposed at an end of the positive electrode, and the negative electrode non-coating portions may be disposed at another end of the negative electrode.

The positive electrodes each may include a positive electrode coating portion, coated with a positive electrode active material, in a region except for the positive electrode non-coating portion, and the negative electrodes each may include a negative electrode coating portion, coated with a negative electrode active material, in a region except for the negative electrode non-coating portion, and the separator may cover at least the positive electrode coating portion or the negative electrode coating portion.

The separator may be a coating separator formed through coating to entirely cover at least the negative electrode coating portion.

The separator may be a unit separator having a size that is equal to or greater than that of the negative electrode.

The unit separator may be disposed at least in duplicate between the negative electrode and the negative electrode.

The unit separator may include a negative electrode non-coating portion exposure part that exposes a region of the negative electrode non-coating portion coupled with the negative electrode tab.

The unit separator may be disposed at the negative electrode non-coating portion between the negative electrodes, and be coupled by the negative electrodes and integrally formed with the negative electrode assembly.

The separator may be an integral separator inserted in zigzag in a direction perpendicular to a lateral direction of the positive electrode and the negative electrode or in the lateral direction of the positive electrode and the negative electrode.

The positive electrode non-coating portions may be coupled with the positive electrode tab using one of ultrasonic welding, resistance welding, and riveting, and the negative electrode non-coating portions may be coupled with the negative electrode tab using one of ultrasonic welding, resistance welding, and riveting.

The external member may be a pouch, and the pouch may include: a main body including a receiving part receiving the electrode assembly; and a cover covering the main body.

The external member may be a prismatic can, and the secondary battery may further include a cap assembly, wherein the cap assembly includes: a cap plate sealing an opening of the prismatic can; an electrode terminal insulated from the cap plate and passing through the cap plate; a conductive plate electrically connected to the electrode terminal; and an insulating plate insulating a region between the conductive plate and the cap plate.

According to another embodiment, a method of fabricating an electrode assembly includes: preparing a positive electrode assembly by stacking a plurality of positive electrodes each having a positive electrode non-coating portion, and by coupling the positive electrode non-coating portions using a positive electrode tab; preparing a negative electrode assembly by stacking a plurality of negative electrodes each having a negative electrode non-coating portion, and by coupling the negative electrode non-coating portions using a negative electrode tab; and forming the electrode assembly by alternately stacking the positive electrodes of the positive electrode assembly and the negative electrodes of the negative electrode assembly.

The method may include, before the preparing of the negative electrode assembly, coating the negative electrode coating portion of the negative electrode with a coating separator to cover the negative electrode coating portion with the coating separator.

The preparing of the negative electrode assembly may include inserting a unit separator, having a size equal to or greater than that of the negative electrode, at least in duplicate between the negative electrode and the negative electrode, when the negative electrodes are stacked.

The forming of the electrode assembly may include, when the positive electrodes and the negative electrodes are stacked alternately, inserting an integral separator in zigzag in a direction perpendicular to a lateral direction of the positive electrode and the negative electrode or in the lateral direction of the positive electrode and the negative electrode.

In the preparing of the positive electrode assembly and the preparing of the negative electrode assembly, the positive electrode non-coating portions may be coupled with the positive electrode tab using one of ultrasonic welding, resistance welding, and riveting, and the negative electrode non-coating portions may be coupled with the negative electrode tab using one of ultrasonic welding, resistance welding, and riveting.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
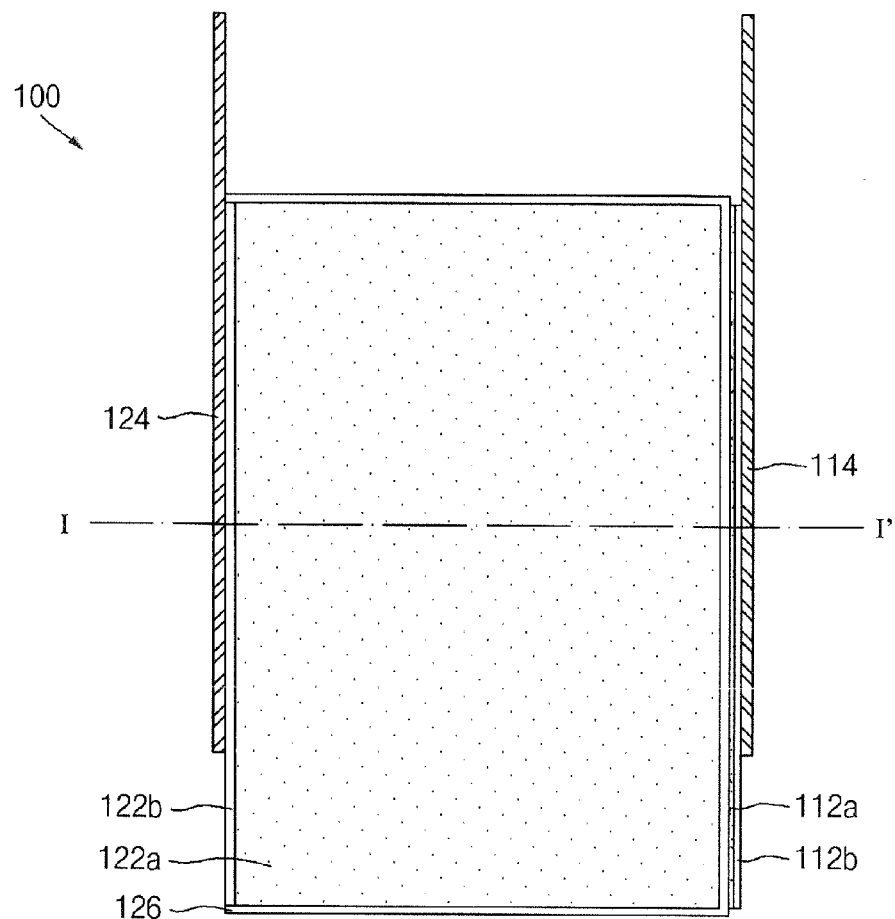
FIG. 1A is a schematic view illustrating an electrode assembly according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Hereinafter, embodiments will be described in detail with reference to the accompanying drawings.

Figure 1B:
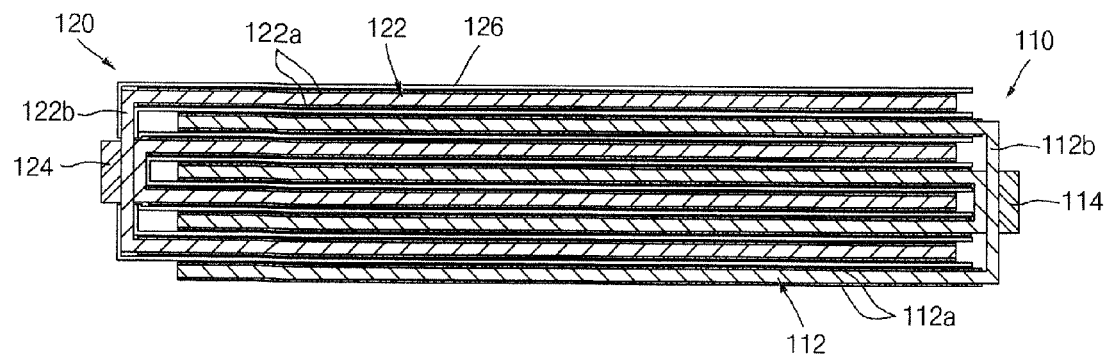
FIG. 1B is a cross-sectional view taken along line of FIG. 1A.
Figure 2A:
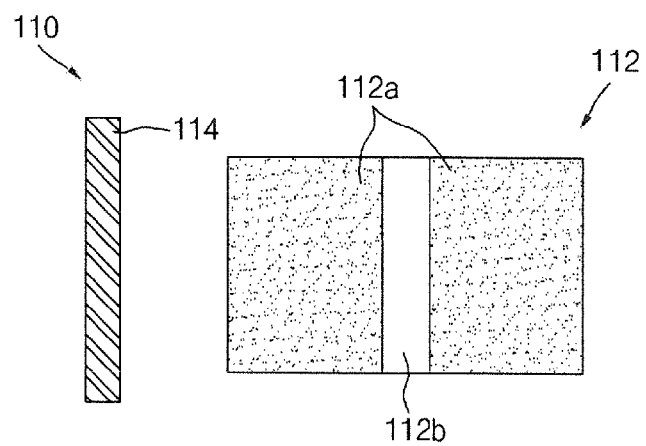
FIG. 2A is a schematic view illustrating components of a positive electrode assembly of an electrode assembly according to an embodiment.
Figure 2B:
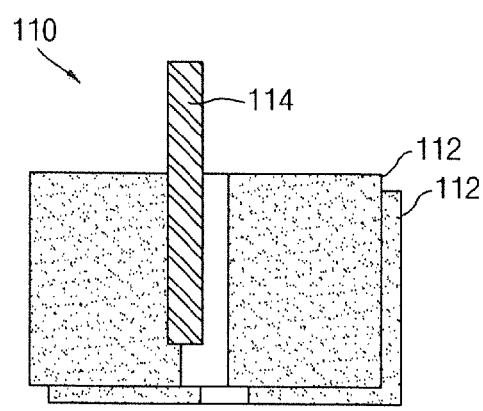
FIG. 2B is a schematic view illustrating the stacking order of the components of the positive electrode assembly of FIG. 2A.
Figure 3A:
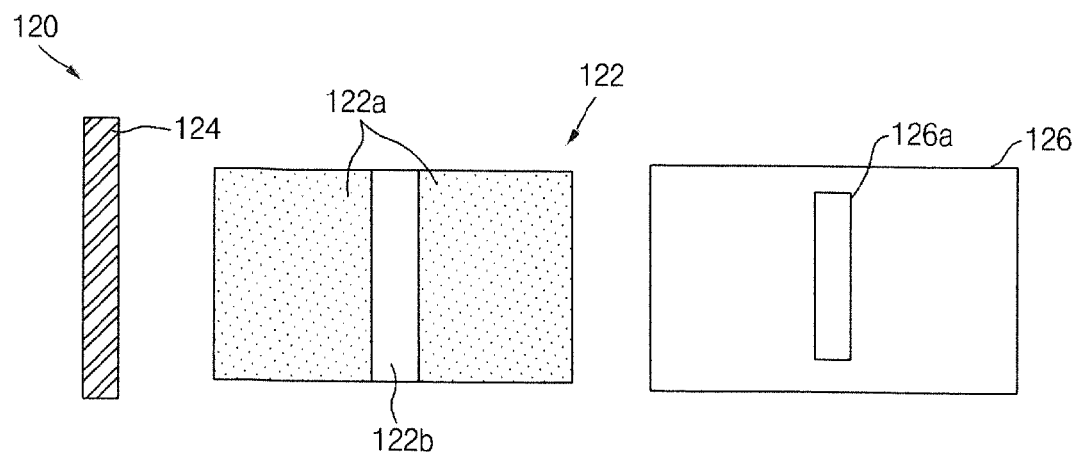
FIG. 3A is a schematic view illustrating components of a negative electrode assembly of an electrode assembly according to an embodiment.
Figure 3B:
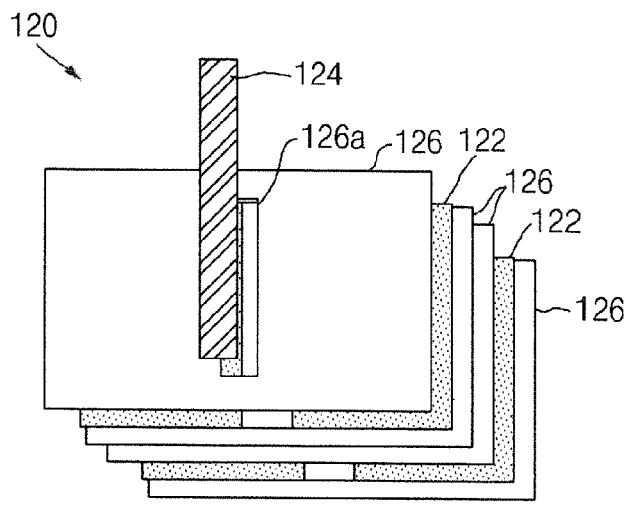
FIG. 3B is a schematic view illustrating the stacking order of the components of the negative electrode assembly of FIG. 3A.

FIG. 1A is a schematic view illustrating an electrode assembly according to an embodiment. FIG. 1B is a cross-sectional view taken along line I-I' of FIG. 1A. FIG. 2A is a schematic view illustrating components of a positive electrode assembly of an electrode assembly according to an embodiment. FIG. 2B is a schematic view illustrating the stacking order of the components of the positive electrode assembly of FIG. 2A. FIG. 3A is a schematic view illustrating components of a negative electrode assembly of an electrode assembly according to an embodiment. FIG. 3B is a schematic view illustrating the stacking order of the components of the negative electrode assembly of FIG. 3A.

Referring to FIGS. 1A through 3B, an electrode assembly 100 according to an embodiment includes a positive electrode assembly 110 and a negative electrode assembly 120.

The positive electrode assembly 110 includes a positive electrode 112 and a positive electrode tab 114 as illustrated in FIG. 2A.

The positive electrode 112 includes positive electrode coating portions 112a coated with positive electrode active materials, and a positive electrode non-coating portion 112b without the coating of the positive electrode active materials to expose a collector of the positive electrode 112.

The positive electrode non-coating portion 112b may be disposed in the middle of the positive electrode 112. In other words, the positive electrode non-coating portion 112b may be disposed at a position where the areas of the positive electrode coating portions 112a disposed at both sides are the same. Thus, in the positive electrode 112, the number of the positive electrode coating portions 112a on one surface may be two, or the number of the positive electrode coating portions 112a on each of one and the other surfaces may be two, that is, the number of the positive electrode coating portions 112a may be four.

The positive electrode assembly 110 may include one or more positive electrodes 112 and one positive electrode tab 114. For example, as illustrated in FIG. 2B, at least two positive electrodes 112 are stacked, and the positive electrode tab 114 integrally couples the positive electrodes 112 to form the positive electrode assembly 110. At this point, since the positive electrodes 112 have the same size, the positive electrode non-coating portions 112b of the positive electrodes 112 overlap each other.

At this point, the positive electrodes 112 may be coupled with the positive electrode tab 114 using any method provided that the positive electrodes 112 and the positive electrode tab 114 are electrically connected in a single body, and, for example, the method may be one of ultrasonic welding, resistance welding, and riveting.

Referring to FIG. 3A, the negative electrode assembly 120 includes a negative electrode 122, a negative electrode tab 124, and a unit separator 126.

The negative electrode 122 includes negative electrode coating portions 122a coated with negative electrode active materials, and a negative electrode non-coating portion 122b without the coating of the negative electrode active materials to expose a collector of the negative electrode 122.

The negative electrode non-coating portion 122b may be disposed in the middle of the negative electrode 122. In other words, the negative electrode non-coating portion 122b may be disposed at a position where the areas of the negative electrode coating portion 122a disposed at both sides are the same. Thus, in the negative electrode 122, the number of the negative electrode coating portions 122a on one surface may be two, or the number of the negative electrode coating portions 122a on each of one and the other surfaces may be two, that is, the number of the negative electrode coating portions 122a may be four.

The unit separator 126 may be disposed between the positive electrode 112 and the negative electrode 122 in the electrode assembly 100 to insulate a region between the positive electrode 112 and the negative electrode 122.

The unit separator 126 has a size that may be equal to or greater than that of the negative electrode 122. Since the negative electrode 122 may be greater in size than the positive electrode 112 in the electrode assembly 100, the unit separator 126 corresponds in size to the negative electrode 122 having the greater size, to insulate the region between the positive electrodes 112 and the negative electrode 122. When the size of the positive electrode 112 is greater than that of the negative electrode 122, the size of the unit separator 126 may be equal to or greater than that of the positive electrode 112, so that the unit separator 126 is provided to the positive electrode assembly 110 in a structure as described in the current embodiment. However, in the present disclosure, in the aggregate, the size of the negative electrode 122 may be greater than that of the positive electrode 112, and thus, other separators including the unit separator 126 may correspond in size to the negative electrode 122.

The negative electrode assembly 120 may include one or more negative electrodes 122, one negative electrode tab 124, and two or more unit separators 126. For example, two or more negative electrodes 122 may be stacked, and two unit separators 126 may be disposed between the negative electrodes 122, and two unit separators 126 may be disposed respectively on both outer sides of the negative electrode assembly 120. For example, as illustrated in FIG. 3B, when the negative electrode assembly 120 includes two negative electrodes 122, two or more unit separators 126 may be disposed between the negative electrodes 122, and one unit separator 126 may be disposed on the outer side of each negative electrode 122.

The unit separator 126 may include at least one negative electrode non-coating portion exposure part 126a that exposes the negative electrode non-coating portion 122b and may be disposed in a region corresponding to the negative electrode non-coating portion 122b of the negative electrode 122. The negative electrode non-coating portion exposure part 126a facilitates coupling of the negative electrode tab 124 to the negative electrode 122, especially, facilitates electrical connection of the negative electrode tab 124 to the negative electrode 122. This is because, since the unit separator 126 may be formed of an insulating material, when the negative electrodes 122 are coupled through the unit separator 126, resistance may increase between the negative electrode tab 124 and the negative electrodes 122.

In addition, the unit separator 126 may be integrally formed with the negative electrode assembly 120. This is because the unit separator 126 disposed between the negative electrodes 122 are coupled while the negative electrodes 122 are coupled by the negative electrode tab 124.

The negative electrode tab 124 integrally couples the negative electrodes 122 to form the negative electrode assembly 120. At this point, since the negative electrodes 122 have the same size, the negative electrode non-coating portions 122b of the negative electrodes 122 overlap each other. Also in this point, the unit separator 126 may be simultaneously stacked between the negative electrodes 122.

At this point, the negative electrodes 122 may be coupled with the negative electrode tab 124 using any method provided that the negative electrodes 122 and the negative electrode tab 124 are electrically connected in a single body, and, for example, the method may be one of ultrasonic welding, resistance welding, and riveting. And, the positive electrode tab 114 and the negative electrode tab 124 extends in same direction along the lengthwise of the positive electrode non-coating portion 112b and the negative electrode non-coating portion 122b.

Referring to FIGS. 1A through 3B, in a method for fabricating the electrode assembly 100, first, a positive electrode assembly preparing operation in which the positive electrode assembly 110 is prepared and a negative electrode assembly preparing operation in which the negative electrode assembly 120 may be prepared are performed simultaneously or sequentially.

As illustrated in FIG. 2A, in the positive electrode assembly preparing operation, one or more positive electrodes 112 and one positive electrode tab 114 are prepared. At this point, the positive electrodes 112 include the positive electrode non-coating portion 112b formed on the middle of at least one surface of the positive electrodes 112, and the positive electrode coating portions 112a formed by coating both sides of the positive electrode non-coating portion 112b with positive electrode active materials.

Then, as illustrated in FIG. 2B, one or more positive electrodes 112 are stacked, if two or more positive electrodes 112, they are stacked such that the positive electrode non-coating portions 112b overlap each other, and then, the positive electrode tab 114 may be disposed on the positive electrode non-coating portion 112b of the positive electrodes 112, and the positive electrode tab 114 may be coupled with the positive electrode non-coating portion 112b to prepare the positive electrode assembly 110.

At this point, the positive electrode non-coating portion 112b may be coupled with the positive electrode 112 using any method provided that the positive electrode non-coating portion 112b may be mechanically coupled in a single body and simultaneously may be electrically connected, and, for example, the method may be one of ultrasonic welding, resistance welding, and riveting.

As illustrated in FIG. 3A, in the negative electrode assembly preparing operation, one or more negative electrodes 122, the negative electrode tab 124, and the unit separator 126 having a size equal to or greater than that of the negative electrode 122 are prepared. At this point, the negative electrodes 122 include the negative electrode non-coating portion 122b formed on the middle of at least one surface of the negative electrodes 122, and the negative electrode coating portions 122a formed by coating both sides of the negative electrode non-coating portion 122b with negative electrode active materials.

Then, as illustrated in FIG. 3B, one or more negative electrodes 122 are stacked, if two or more negative electrodes 122, they are stacked such that the negative electrode non-coating portions 122b overlap each other. At this point, when one negative electrode 122 is provided, the unit separator 126 may be stacked on each of the upper and lower portions of the negative electrodes 122, and when two or more negative electrodes 122 are provided, two unit separators 126 are stacked between the negative electrodes 122, and one unit separator 126 may be stacked on each of the upper and lower portions of two negative electrodes 122 at the outermost sides, that is, one unit separator 126 may be disposed on each of both outermost sides of the negative electrode assembly 120, and then, the negative electrode tab 124 may be disposed on the negative electrode non-coating portion 122b of the negative electrode 122 and may be coupled to the negative electrode non-coating portion 122b of the negative electrode 122 to prepare the negative electrode assembly 120.

At this point, the negative electrode non-coating portion 122b may be coupled with the negative electrode 122 using any method provided that the negative electrode non-coating portion 122b may be mechanically coupled in a single body and simultaneously may be electrically connected, and, for example, the method may be one of ultrasonic welding, resistance welding, and riveting.

Subsequently, as illustrated in FIG. 1B, the positive electrode assembly 110 and the negative electrode assembly 120 are folded respectively along the positive electrode non-coating portion 112b and the negative electrode non-coating portion 122b such that the positive electrode tab 114 and the negative electrode tab 124 are disposed on side surfaces.

Then, the positive electrode assembly 110 and the negative electrode assembly 120 are disposed to face each other so that the positive electrode tab 114 and the negative electrode tab 124 are disposed on both side surfaces of the electrode assembly 100, and then, the positive electrodes 112 of the positive electrode assembly 110 and the negative electrodes 122 of the negative electrode assembly 120 are inserted into each other to be alternately stacked, thereby completing the electrode assembly 100 according to the current embodiment. At this point, the positive electrodes 112 and the negative electrodes 122 are inserted such that the unit separator 126 may be disposed between the positive electrode 112 and the negative electrode 122.

Figure 4A:
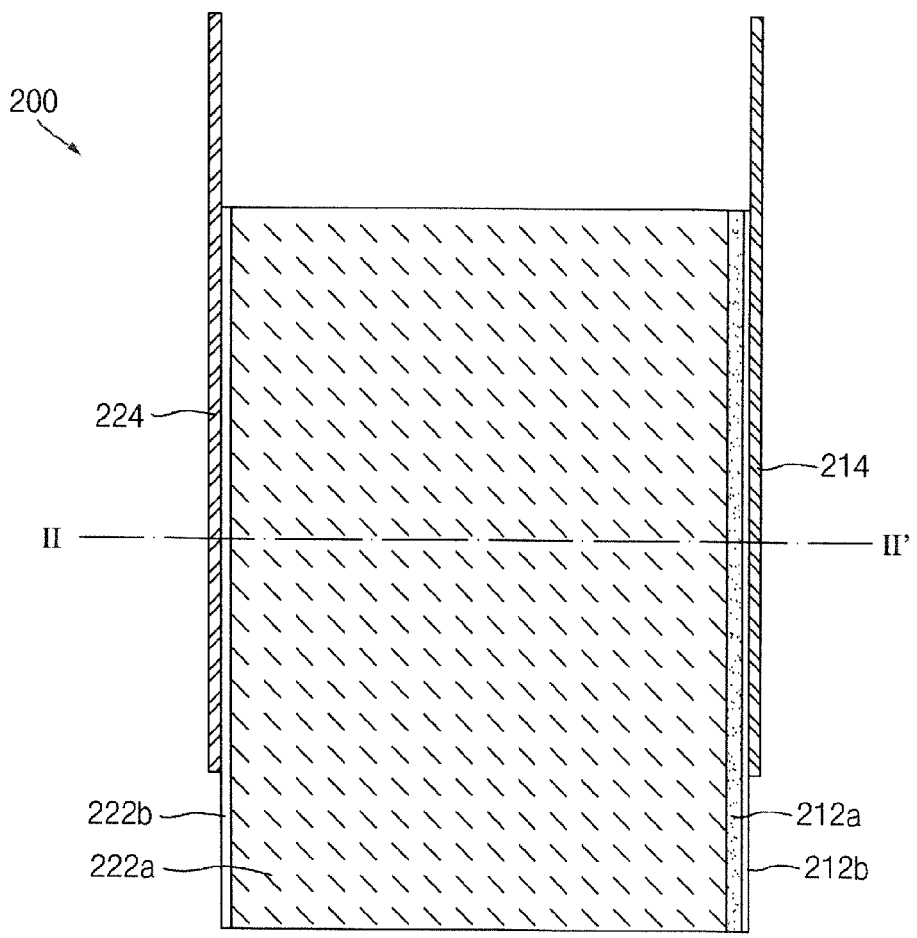
FIG. 4A is a schematic view illustrating an electrode assembly according to another embodiment.
Figure 4B:
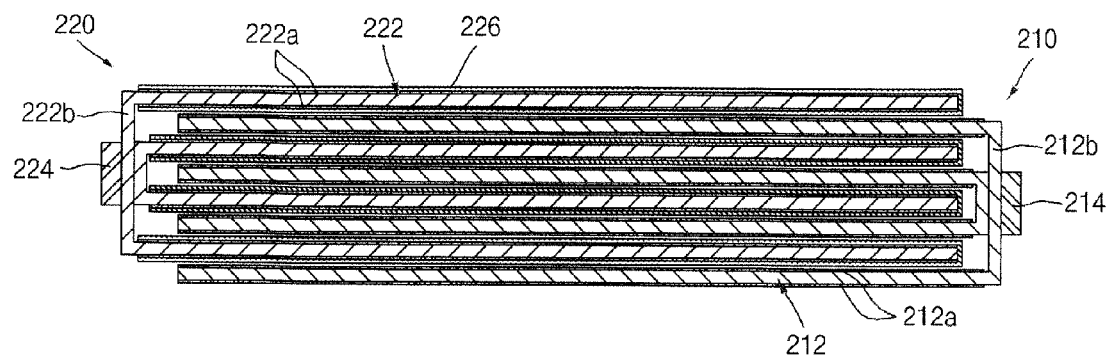
FIG. 4B is a cross-sectional view taken along line II-II' of FIG. 4A.
Figure 5A:
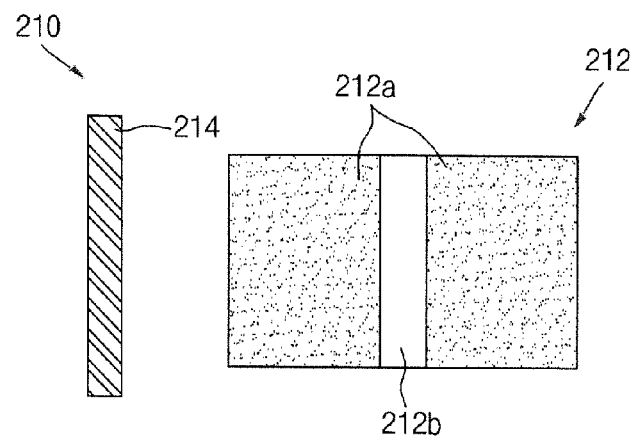
FIG. 5A is a schematic view illustrating components of a positive electrode assembly of an electrode assembly according to another embodiment.
Figure 5B:
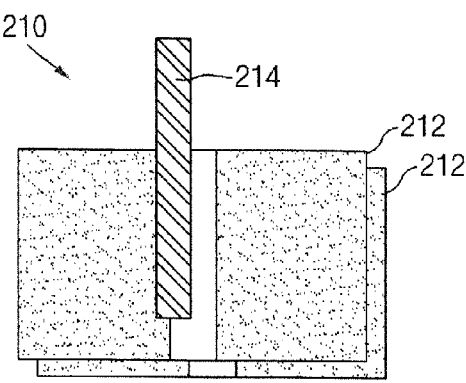
FIG. 5B is a schematic view illustrating the stacking order of the components of the positive electrode assembly of FIG. 5A.
Figure 6A:
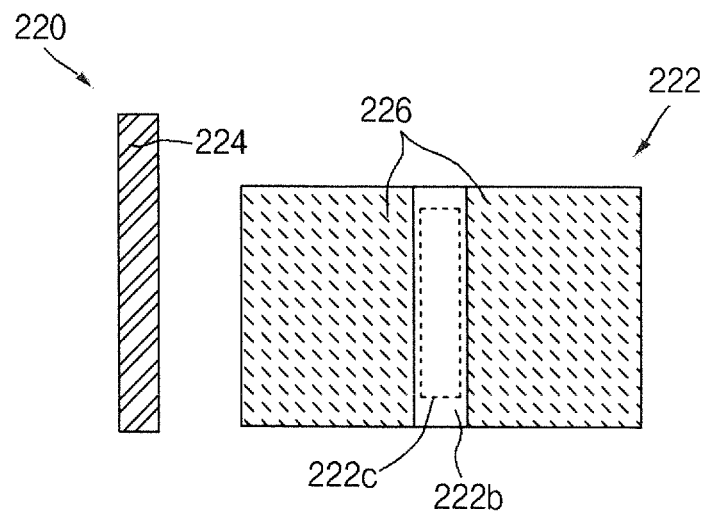
FIG. 6A is a schematic view illustrating components of a negative electrode assembly of an electrode assembly according to another embodiment.

FIG. 4A is a schematic view illustrating an electrode assembly according to another embodiment. FIG. 4B is a cross-sectional view taken along line II-II' of FIG. 4A. FIG. 5A is a schematic view illustrating components of a positive electrode assembly of an electrode assembly according to another embodiment. FIG. 5B is a schematic view illustrating the stacking order of the components of the positive electrode assembly of FIG. 5A. FIG. 6A is a schematic view illustrating components of a negative electrode assembly of an electrode assembly according to another embodiment.

Figure 6B:
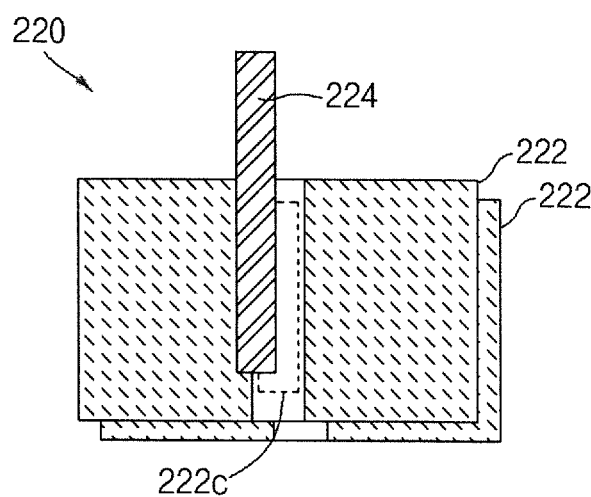
FIG. 6B is a schematic view illustrating the stacking order of the components of the negative electrode assembly of FIG. 6A.

FIG. 6B is a schematic view illustrating the stacking order of the components of the negative electrode assembly of FIG. 6A.

Referring to FIGS. 4A through 6B, an electrode assembly 200 according to another embodiment includes a positive electrode assembly 210 and a negative electrode assembly 220.

The positive electrode assembly 210 includes a positive electrode 212 and a positive electrode tab 214 as illustrated in FIG. 5A.

The positive electrode 212 includes positive electrode coating portions 212a coated with positive electrode active materials, and a positive electrode non-coating portion 212b without the coating of the positive electrode active materials to expose a collector of the positive electrode 212.

The positive electrode 212 and the positive electrode tab 214 are the same as the positive electrode 112 and the positive electrode tab 114 described with reference to FIGS. 1A through 3B, and are stacked in the same order to constitute the positive electrode assembly 210, and thus, a detailed description thereof will be omitted.

Referring to FIGS. 4B and 6A, the negative electrode assembly 220 includes a negative electrode 222, a negative electrode tab 224, and coating separators 226.

The negative electrode 222 includes negative electrode coating portions 222a coated with negative electrode active materials, and a negative electrode non-coating portion 222b without the coating of the negative electrode active materials to expose a collector of the negative electrode 222.

The negative electrode non-coating portion 222b may be disposed in the middle of the negative electrode 222. In other words, the negative electrode non-coating portion 222b may be disposed at a position where the areas of the negative electrode coating portion 222a disposed at both sides are the same. Thus, in the negative electrode 222, the number of the negative electrode coating portions 222a on one surface may be two, or the number of the negative electrode coating portions 222a on each of one and the other surfaces may be two, that is, the number of the negative electrode coating portions 222a may be four.

The coating separators 226 insulate a region between the positive electrode 112 and the negative electrode 122.

The coating separators 226 may be formed using a method of coating a surface or both surfaces of the negative electrode 222 with an insulating film. At this point, the coating separators 226 may be formed to cover at least the negative electrode coating portions 222a. Furthermore, the coating separators 226 may be formed to cover the entire region of the negative electrode 222 except for a region 222c of the negative electrode non-coating portion 222b coupled with the negative electrode tab 224. This is because the coating separators 226 insulate the region between the positive electrode 212 and the negative electrode 222.

The negative electrode tab 224 integrally couples the negative electrodes 222 to form the negative electrode assembly 220. At this point, since the negative electrodes 222 have the same size, the negative electrode non-coating portions 222b of the negative electrodes 222 overlap each other.

At this point, the negative electrodes 222 may be coupled with the negative electrode tab 224 using any method provided that the negative electrodes 222 and the negative electrode tab 224 are electrically connected in a single body, and, for example, the method may be one of ultrasonic welding, resistance welding, and riveting.

Referring to FIGS. 4A through 6B, in a method for fabricating the electrode assembly 200, first, a positive electrode assembly preparing operation in which the positive electrode assembly 210 is prepared and a negative electrode assembly preparing operation in which the negative electrode assembly 220 is prepared are performed simultaneously or sequentially.

As illustrated in FIG. 5A, in the positive electrode assembly preparing operation, one or more positive electrodes 212 and one positive electrode tab 214 are prepared. At this point, the positive electrodes 212 include the positive electrode non-coating portion 212b formed on the middle of at least one surface of the positive electrodes 212, and the positive electrode coating portions 212a formed by coating both sides of the positive electrode non-coating portion 212b with positive electrode active materials.

Then, as illustrated in FIG. 5B, one or more positive electrodes 212 are stacked, if two or more positive electrodes 212, they are stacked such that the positive electrode non-coating portions 212b overlap each other, and then, the positive electrode tab 214 may be disposed on the positive electrode non-coating portion 212b of the positive electrodes 212, and the positive electrode tab 214 may be coupled with the positive electrode non-coating portion 212b to prepare the positive electrode assembly 210.

At this point, the positive electrode non-coating portion 212b may be coupled with the positive electrode 212 using any method provided that the positive electrode non-coating portion 212b may be mechanically coupled in a single body and simultaneously may be electrically connected, and, for example, the method may be one of ultrasonic welding, resistance welding, and riveting.

As illustrated in FIGS. 4B and 6A, in the negative electrode assembly preparing operation, the negative electrode non-coating portion 222b may be formed on the middle of at least one surface of the negative electrodes 222, and the negative electrode coating portions 222a are formed by coating both sides of the negative electrode non-coating portion 222b with negative electrode active materials, and one or more negative electrodes 222 in which the region of at least the negative electrode 222, except for the region 222c of the negative electrode non-coating portion 222b coupled with the negative electrode tab 224, may be coated with the coating separators 226 are prepared, and the negative electrode tab 224 is prepared.

Then, as illustrated in FIG. 6B, one or more negative electrodes 222 coated with the coating separators 226 are stacked, if two or more negative electrodes 222, they are stacked such that the negative electrode non-coating portions 222b overlap each other, and then, the negative electrode tab 224 may be disposed on the negative electrode non-coating portion 222b of the negative electrodes 222, and the negative electrode tab 224 may be coupled with the negative electrode non-coating portion 222b to prepare the negative electrode assembly 220.

At this point, the negative electrode non-coating portion 222b may be coupled with the negative electrode 222 using any method provided that the negative electrode non-coating portion 222b may be mechanically coupled in a single body and simultaneously may be electrically connected, and, for example, the method may be one of ultrasonic welding, resistance welding, and riveting.

Subsequently, as illustrated in FIG. 4B, the positive electrode assembly 210 and the negative electrode assembly 220 are folded respectively along the positive electrode non-coating portion 212b and the negative electrode non-coating portion 222b such that the positive electrode tab 214 and the negative electrode tab 224 are disposed on side surfaces.

Then, the positive electrode assembly 210 and the negative electrode assembly 220 are disposed to face each other so that the positive electrode tab 214 and the negative electrode tab 224 are disposed on both side surfaces of the electrode assembly 200, and then, the positive electrodes 212 of the positive electrode assembly 210 and the negative electrodes 222 of the negative electrode assembly 220 are inserted into each other to be alternately stacked, thereby completing the electrode assembly 200 according to the current embodiment. At this point, the coating separator 226 is naturally disposed between the positive electrode 212 and the negative electrode 222 to insulate the positive electrode 212 and the negative electrode 222.

Figure 7A:
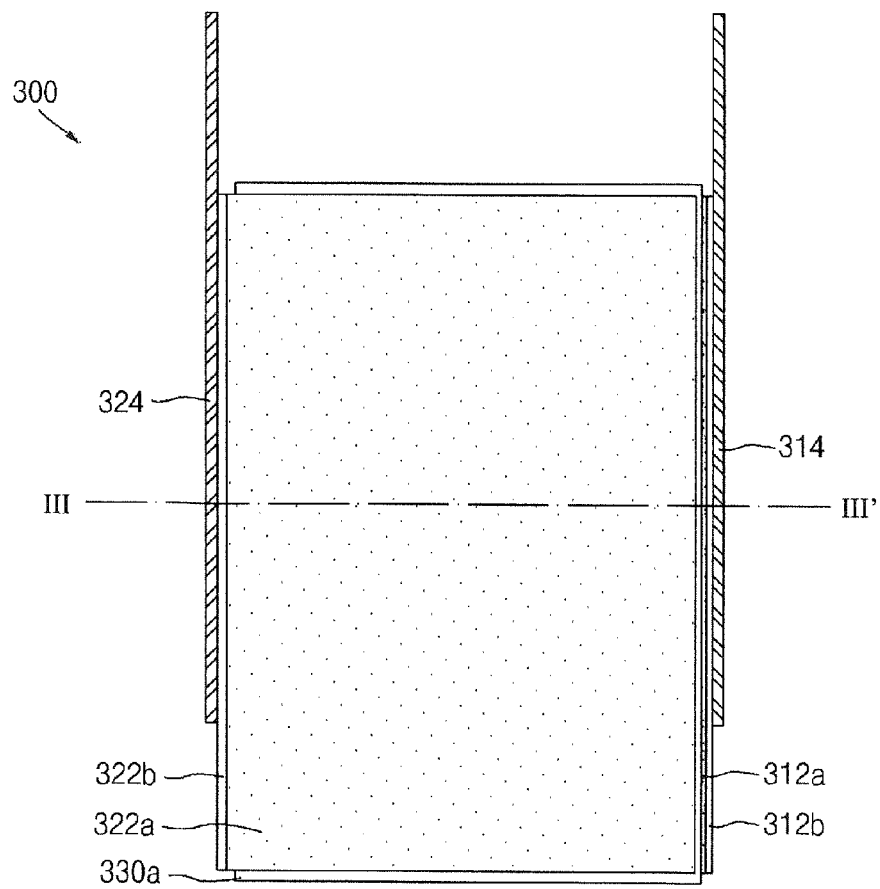
FIG. 7A is a schematic view illustrating an electrode assembly according to another embodiment.
Figure 7B:
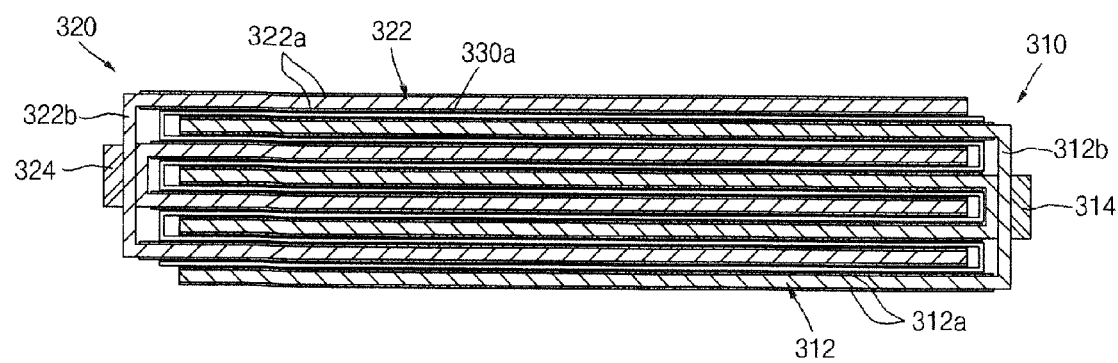
FIG. 7B is a cross-sectional view taken along line of FIG. 7A.
Figure 8A:
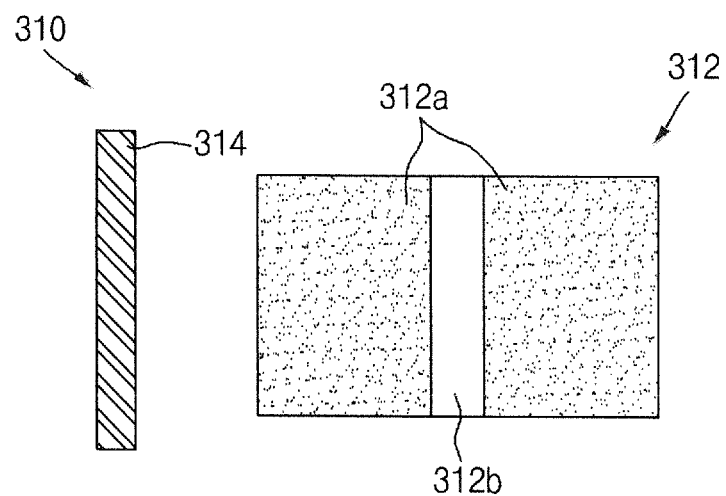
FIG. 8A is a schematic view illustrating components of a positive electrode assembly of an electrode assembly according to another embodiment.
Figure 8B:
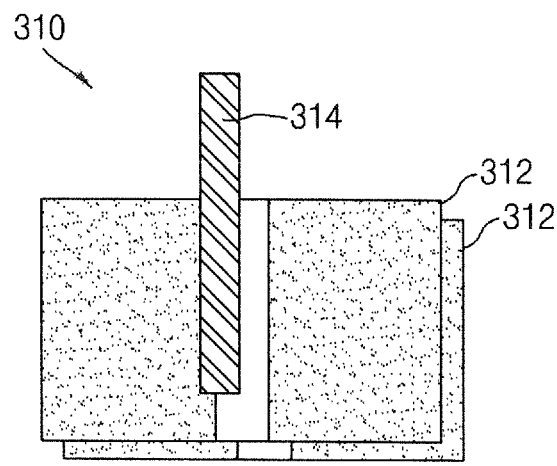
FIG. 8B is a schematic view illustrating the stacking order of the components of the positive electrode assembly of FIG. 8A.
Figure 9A:
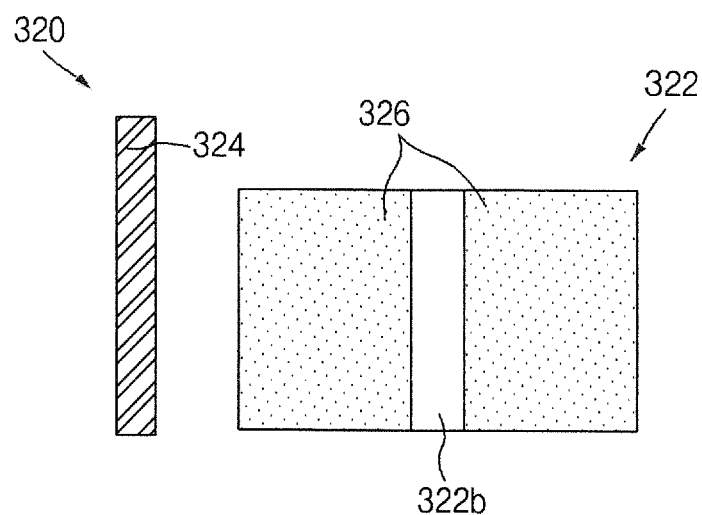
FIG. 9A is a schematic view illustrating components of a negative electrode assembly of an electrode assembly according to another embodiment.
Figure 9B:
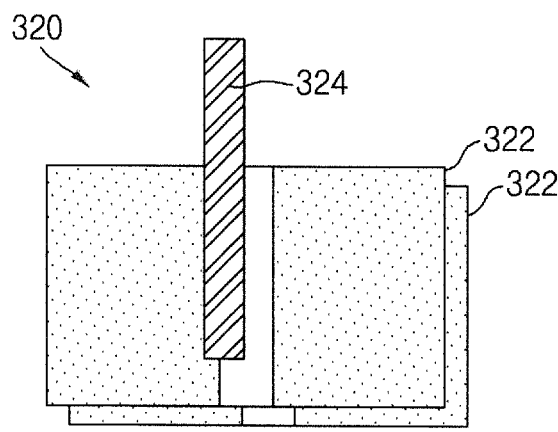
FIG. 9B is a schematic view illustrating the stacking order of the components of the negative electrode assembly of FIG. 9A.
Figure 10A:
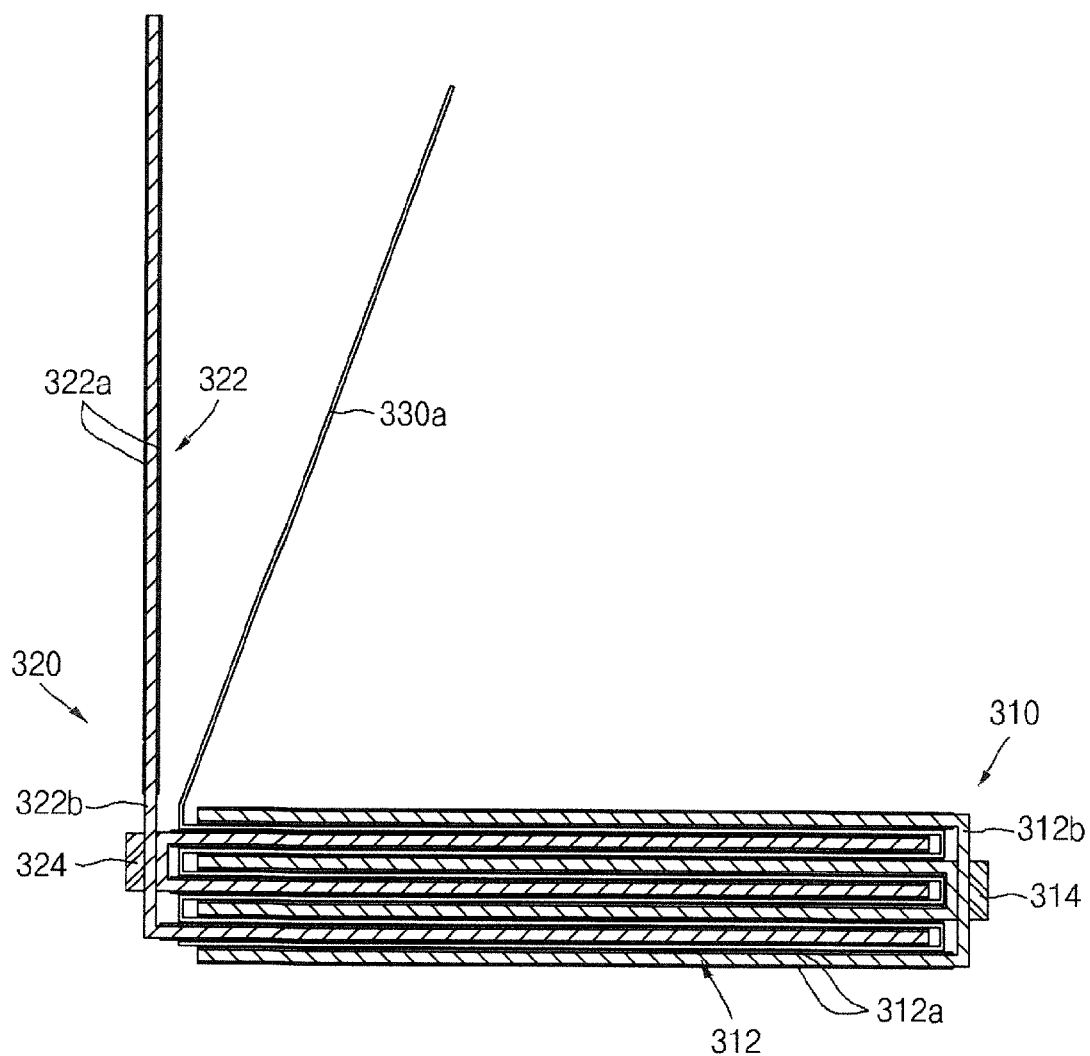
FIG. 10A is a schematic view illustrating a method of stacking an integral separator of an electrode assembly according to another embodiment.
Figure 10B:
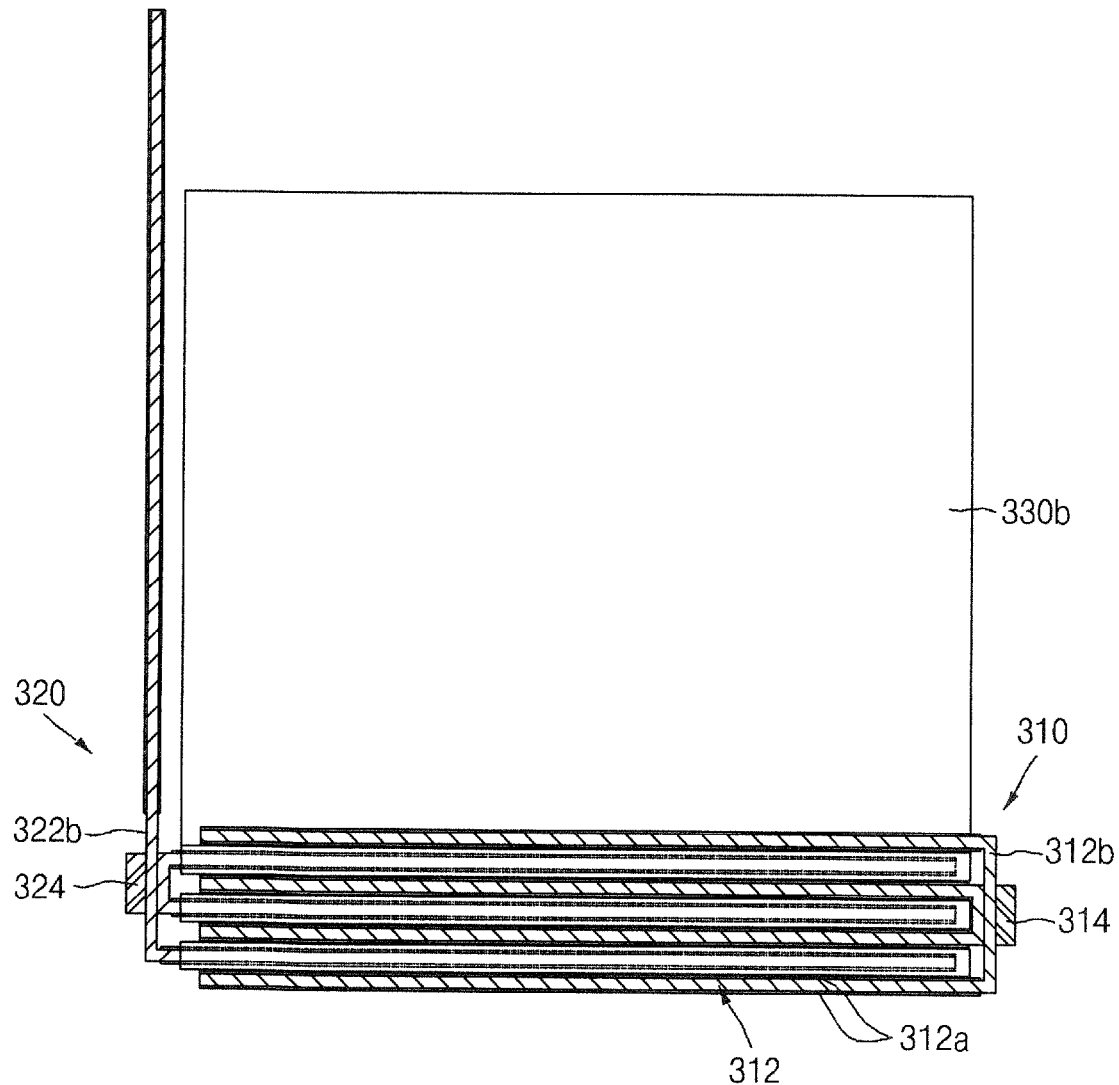
FIG. 10B is a schematic view illustrating a method of stacking an integral separator of an electrode assembly according to another embodiment.

FIG. 7A is a schematic view illustrating an electrode assembly according to another embodiment. FIG. 7B is a cross-sectional view taken along line of FIG. 7A. FIG. 8A is a schematic view illustrating components of a positive electrode assembly of an electrode assembly according to another embodiment. FIG. 8B is a schematic view illustrating the stacking order of the components of the positive electrode assembly of FIG. 8A. FIG. 9A is a schematic view illustrating components of a negative electrode assembly of an electrode assembly according to another embodiment. FIG. 9B is a schematic view illustrating the stacking order of the components of the negative electrode assembly of FIG. 9A. FIG. 10A is a schematic view illustrating a method of stacking an integral separator of an electrode assembly according to another embodiment. FIG. 10B is a schematic view illustrating a method of stacking an integral separator of an electrode assembly according to another embodiment.

Referring to FIGS. 7A through 10B, an electrode assembly 300 according to another embodiment includes a positive electrode assembly 310, a negative electrode assembly 320, and an integral separator 330a or 330b. In this case, the electrode assembly 300 illustrated in FIGS. 7A and 7B includes the integral separator 330a to be described with reference to FIG. 10A, but may include the integral separator 330b to be described with reference to FIG. 10B.

The positive electrode assembly 310 includes a positive electrode 312 and a positive electrode tab 314 as illustrated in FIGS. 8A and 8B.

The positive electrode 312 includes positive electrode coating portions 312a coated with positive electrode active materials, and a positive electrode non-coating portion 312b without the coating of the positive electrode active materials to expose a collector of the positive electrode 312.

The positive electrode 312 and the positive electrode tab 314 are the same as the positive electrode 112 and the positive electrode tab 114 described with reference to FIGS. 1A through 3B, and are stacked in the same order to constitute the positive electrode assembly 310, and thus, a detailed description thereof will be omitted.

Referring to FIG. 9A, the negative electrode assembly 320 includes a negative electrode 322 and a negative electrode tab 324.

The negative electrode 322 includes negative electrode coating portions 322a coated with negative electrode active materials, and a negative electrode non-coating portion 322b without the coating of the negative electrode active materials to expose a collector of the negative electrode 322.

The negative electrode non-coating portion 322b may be disposed in the middle of the negative electrode 322. In other words, the negative electrode non-coating portion 322b may be disposed at a position where the areas of the negative electrode coating portion 322a disposed at both sides are the same. Thus, in the negative electrode 322, the number of the negative electrode coating portions 322a on one surface may be two, or the number of the negative electrode coating portions 322a on each of one and the other surfaces may be two, that is, the number of the negative electrode coating portions 322a may be four.

The negative electrode tab 324 integrally couples the negative electrodes 322 to form the negative electrode assembly 320. At this point, since the negative electrodes 322 have the same size, the negative electrode non-coating portions 322b of the negative electrodes 322 overlap each other.

At this point, the negative electrodes 322 may be coupled with the negative electrode tab 324 using any method provided that the negative electrodes 322 and the negative electrode tab 324 are electrically connected in a single body, and, for example, the method may be one of ultrasonic welding, resistance welding, and riveting.

The integral separators 330a and 330b are different in type.

That is, as illustrated in FIG. 10A, the integral separator 330a may be provided, which may be inserted in zigzag in a lateral direction of the positive electrode 312 and the negative electrode 322 (in a direction parallel to the line of FIG. 7A) when the positive electrode 312 and the negative electrode 322 are alternately stacked. That is, the integral separator 330a may be disposed between the positive electrode 312 and the negative electrode 322 in a manner of surrounding both ends of the positive electrode 312 and the negative electrode 322 (the end of the positive electrode 312 is an end surface facing the negative electrode non-coating portion 322b of the negative electrode assembly 320, and the end of the negative electrode 322 is an end surface facing the positive electrode non-coating portion 312b of the positive electrode assembly 310) to insulate the positive electrode 312 and the negative electrode 322.

In addition, as illustrated in FIG. 10B, the integral separator 330b may be provided, that may be inserted in zigzag in a direction perpendicular to the lateral direction of the positive electrode 312 and the negative electrode 322 (to the direction parallel to the line C-C' of FIG. 7A) when the positive electrode 312 and the negative electrode 322 are alternately stacked. That is, the integral separator 330b may be disposed between the positive electrode 312 and the negative electrode 322 in a manner of surrounding both side surfaces of the positive electrode 312 and the negative electrode 322 (both the side surfaces of the positive electrode 312 and the negative electrode 322 are two side surfaces except for both the ends of the positive electrode 312 and the negative electrode 322) to insulate the positive electrode 312 and the negative electrode 322.

Referring to FIGS. 7A through 10B, in a method for fabricating the electrode assembly 300, first, a positive electrode assembly preparing operation in which the positive electrode assembly 310 is prepared, and a negative electrode assembly preparing operation in which the negative electrode assembly 320 is prepared are performed simultaneously or sequentially.

As illustrated in FIG. 8A, in the positive electrode assembly preparing operation, one or more positive electrodes 312 and one positive electrode tab 314 are prepared. At this point, the positive electrodes 312 include the positive electrode non-coating portion 312b formed on the middle of at least one surface of the positive electrodes 312, and the positive electrode coating portions 312a formed by coating both sides of the positive electrode non-coating portion 312b with positive electrode active materials.

Then, as illustrated in FIG. 8B, one or more positive electrodes 312 are stacked, if two or more positive electrodes 312, they are stacked such that the positive electrode non-coating portions 312b overlap each other, and then, the positive electrode tab 314 may be disposed on the positive electrode non-coating portion 312b of the positive electrodes 312, and the positive electrode tab 314 may be coupled with the positive electrode non-coating portion 312b to prepare the positive electrode assembly 310.

At this point, the positive electrode non-coating portion 312b may be coupled with the positive electrode 312 using any method provided that the positive electrode non-coating portion 312b may be mechanically coupled in a single body and simultaneously may be electrically connected, and, for example, the method may be one of ultrasonic welding, resistance welding, and riveting.

As illustrated in FIG. 9A, in the negative electrode assembly preparing operation, one or more negative electrodes 322 and the negative electrode tab 324 are prepared. At this point, the negative electrodes 322 include the negative electrode non-coating portion 322b formed on the middle of at least one surface of the negative electrodes 322, and the negative electrode coating portions 322a formed by coating both sides of the negative electrode non-coating portion 322b with negative electrode active materials.

Then, as illustrated in FIG. 9B, one or more negative electrodes 322 are stacked, if two or more negative electrodes 322, they are stacked such that the negative electrode non-coating portions 322b overlap each other, and then, the negative electrode tab 324 may be disposed on the negative electrode non-coating portion 322b of the negative electrodes 322, and the negative electrode tab 324 may be coupled with the negative electrode non-coating portion 322b to prepare the negative electrode assembly 320.

At this point, the negative electrode non-coating portion 322b may be coupled with the negative electrode 322 using any method provided that the negative electrode non-coating portion 322b may be mechanically coupled in a single body and simultaneously may be electrically connected, and, for example, the method may be one of ultrasonic welding, resistance welding, and riveting.

Subsequently, as illustrated in FIGS. 10A and 10B, the positive electrode assembly 310 and the negative electrode assembly 320 are folded respectively along the positive electrode non-coating portion 312b and the negative electrode non-coating portion 322b such that the positive electrode tab 314 and the negative electrode tab 324 are disposed on side surfaces, and while the positive electrode 312 and the negative electrode 322 are repeatedly folded, the integral separator 330a may be inserted in zigzag in the lateral direction of the positive electrode 312 and the negative electrode 322, or the integral separator 330b may be inserted in zigzag in the direction perpendicular to the lateral direction of the positive electrode 312 and the negative electrode 322, so that the integral separator 330a or 330b may be disposed between the positive electrode 312 and the negative electrode 322, thereby completing the electrode assembly 300 according to the current embodiment.

Figure 11A:
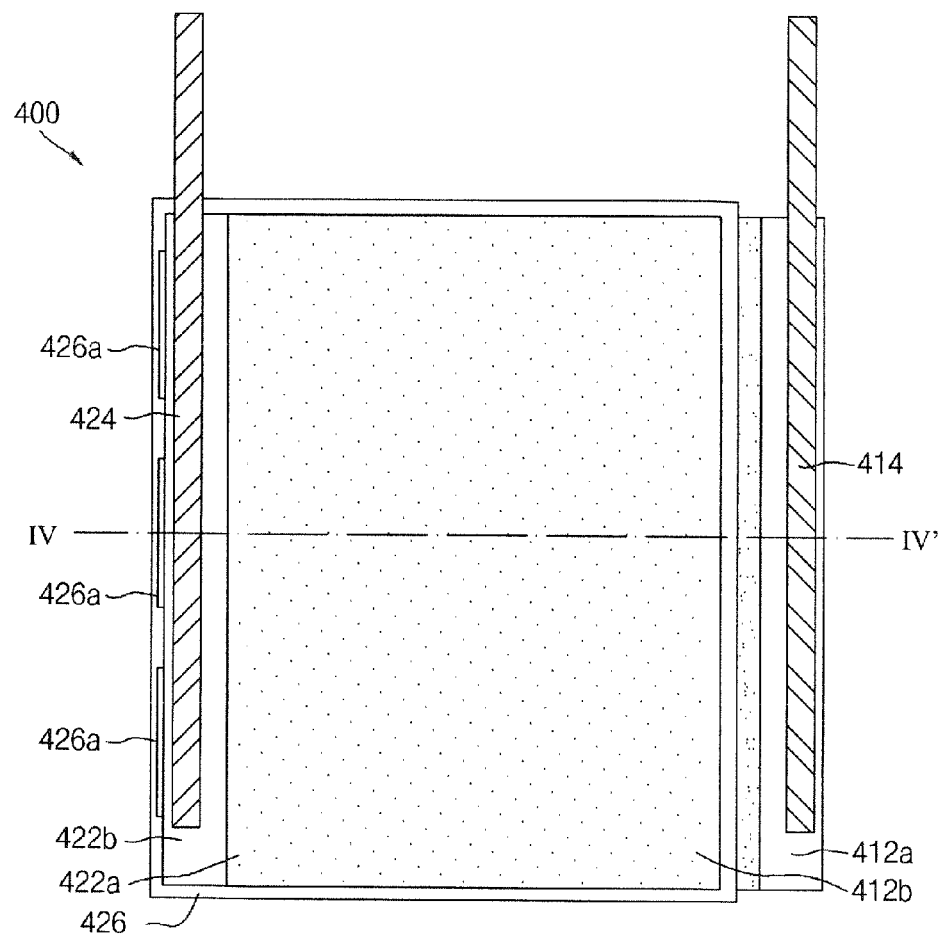
FIG. 11A is a schematic view illustrating an electrode assembly according to another embodiment.
Figure 11B:
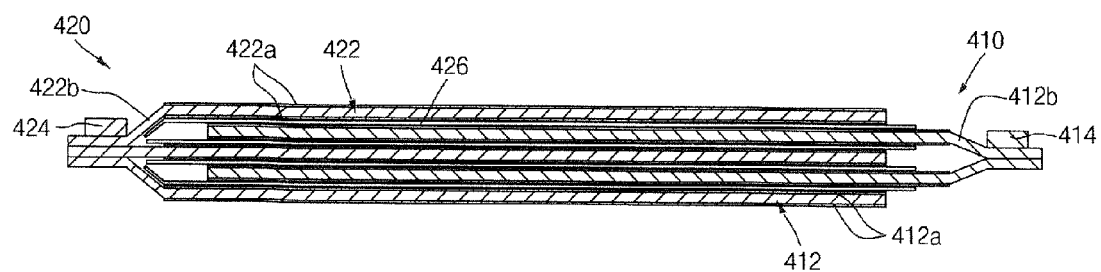
FIG. 11B is a cross-sectional view taken along line IV-IV' of FIG. 11A.
Figure 12A:
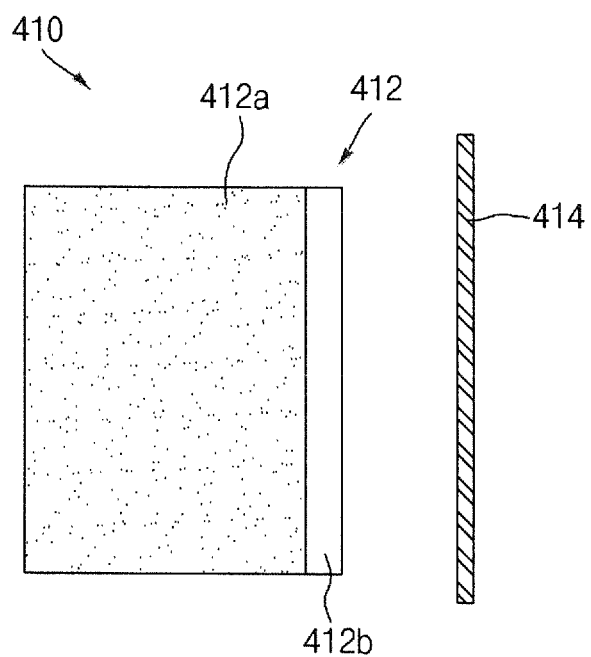
FIG. 12A is a schematic view illustrating components of a positive electrode assembly of an electrode assembly according to another embodiment.
Figure 12B:
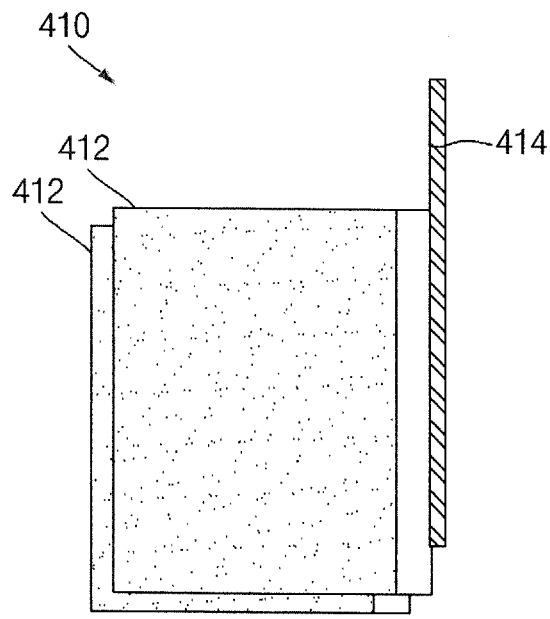
FIG. 12B is a schematic view illustrating the stacking order of the components of the positive electrode assembly of FIG. 12A.
Figure 13A:
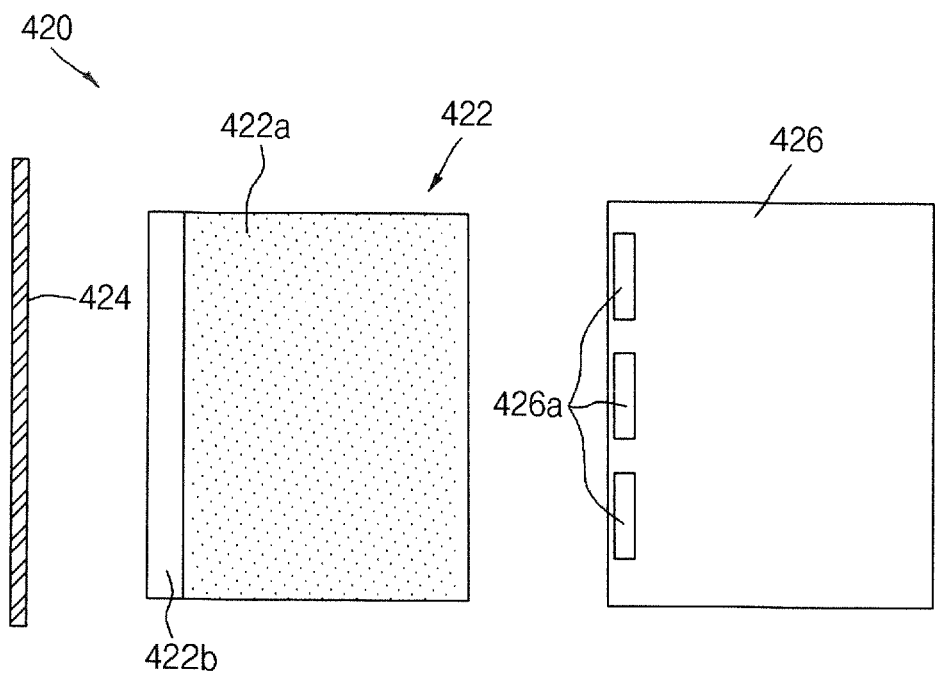
FIG. 13A is a schematic view illustrating components of a negative electrode assembly of an electrode assembly according to another embodiment.
Figure 13B:
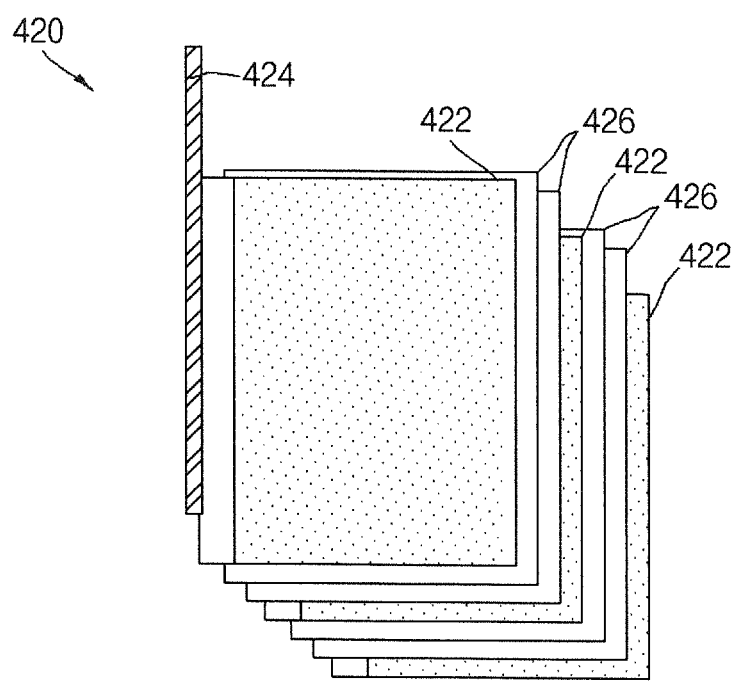
FIG. 13B is a schematic view illustrating the stacking order of the components of the negative electrode assembly of FIG. 13A.

FIG. 11A is a schematic view illustrating an electrode assembly according to another embodiment. FIG. 11B is a cross-sectional view taken along line IV-IV' of FIG. 11A. FIG. 12A is a schematic view illustrating components of a positive electrode assembly of an electrode assembly according to another embodiment. FIG. 12B is a schematic view illustrating the stacking order of the components of the positive electrode assembly of FIG. 12A. FIG. 13A is a schematic view illustrating components of a negative electrode assembly of an electrode assembly according to another embodiment. FIG. 13B is a schematic view illustrating the stacking order of the components of the negative electrode assembly of FIG. 13A.

Referring to FIGS. 11A through 13B, an electrode assembly 400 according to another embodiment includes a positive electrode assembly 410 and a negative electrode assembly 420.

The positive electrode assembly 410 includes a positive electrode 412 and a positive electrode tab 414 as illustrated in FIG. 12A.

The positive electrode 412 includes positive electrode coating portions 412a coated with positive electrode active materials, and a positive electrode non-coating portion 412b without the coating of the positive electrode active materials to expose a collector of the positive electrode 412.

The positive electrode 412 and the positive electrode tab 414 are substantially the same as the positive electrode 112 and the positive electrode tab 114 described with reference to FIGS. 1A through 3B, and are stacked in the same order to constitute the positive electrode assembly 410, and thus, a detailed description thereof will be omitted. However, the current embodiment is different from the previous one in that the positive electrode non-coating portion 412b may be disposed at a first end of the positive electrode 412 (the right side of the positive electrode 412 based on the drawing is defined as the first end, and the left side is a second end), not in the middle of the positive electrode 412.

Referring to FIG. 12A, the negative electrode assembly 420 includes a negative electrode 422, a negative electrode tab 424, and a unit separator 426.

The negative electrode 422 includes negative electrode coating portions 422a coated with negative electrode active materials, and a negative electrode non-coating portion 422b without the coating of the negative electrode active materials to expose a collector of the negative electrode 422.

The negative electrode non-coating portion 422b may be disposed at the second end of the negative electrode 422, which may be opposite to that of the positive electrode 412.

The unit separator 426 may be disposed between the positive electrode 412 and the negative electrode 422 in the electrode assembly 400 to insulate a region between the positive electrode 412 and the negative electrode 422.

The unit separator 426 has a size that may be equal to or greater than that of the negative electrode 422. Since the negative electrode 422 may be greater in size than the positive electrode 412 in the electrode assembly 400, the unit separator 426 corresponds in size to the negative electrode 422 having the greater size, to insulate the region between the positive electrodes 412 and the negative electrode 422.

The negative electrode assembly 420 may include one or more negative electrodes 422, one negative electrode tab 424, and two or more unit separators 426. For example, two or more negative electrodes 422 may be stacked, and two unit separators 426 may be disposed between the negative electrodes 422. The unit separator 426 may not be disposed on both outermost sides of the negative electrode assembly 420, and may be disposed at least one side. For example, as illustrated in FIG. 11B, when the negative electrode assembly 420 includes three negative electrodes 422 and two positive electrodes 412, the number of the unit separators 126 disposed in each space between the negative electrodes 422 may be just two.

The unit separator 426 may include at least one negative electrode non-coating portion exposure part 426a that exposes the negative electrode non-coating portion 422b and may be disposed in a region corresponding to the negative electrode non-coating portion 422b of the negative electrode 422. The negative electrode non-coating portion exposure part 426a facilitates coupling of the negative electrode tab 424 to the negative electrode 422, especially, facilitates electrical connection of the negative electrode tab 424 to the negative electrode 422. This is because, since the unit separator 426 may be formed of an insulating material, when the negative electrodes 422 are coupled through the unit separator 426, resistance may increase between the negative electrode tab 424 and the negative electrodes 422.

In addition, the unit separator 426 may be integrally formed with the negative electrode assembly 420. This is because the unit separator 426 disposed between the negative electrodes 422 are coupled while the negative electrodes 422 are coupled by the negative electrode tab 424.

The negative electrode tab 424 integrally couples the negative electrodes 422 to form the negative electrode assembly 420. At this point, since the negative electrodes 422 have the same size, the negative electrode non-coating portions 422b of the negative electrodes 422 overlap each other. Also in this point, the unit separator 426 may be simultaneously stacked between the negative electrodes 422.

At this point, the negative electrodes 422 may be coupled with the negative electrode tab 424 using any method provided that the negative electrodes 422 and the negative electrode tab 424 are electrically connected in a single body, and, for example, the method may be one of ultrasonic welding, resistance welding, and riveting.

Referring to FIGS. 11A through 13B, in a method for fabricating the electrode assembly 400, first, a positive electrode assembly preparing operation in which the positive electrode assembly 410 is prepared and a negative electrode assembly preparing operation in which the negative electrode assembly 420 is prepared are performed simultaneously or sequentially.

As illustrated in FIG. 12A, in the positive electrode assembly preparing operation, one or more positive electrodes 412 and one positive electrode tab 414 are prepared. At this point, the positive electrodes 412 include the positive electrode non-coating portion 412b formed on the first end of at least one surface of the positive electrodes 412, and the positive electrode coating portions 412a formed by coating a region, except for the first end of the positive electrode non-coating portion 412h, with positive electrode active materials.

Then, as illustrated in FIG. 12B, one or more positive electrodes 412 are stacked, if two or more positive electrodes 412, they are stacked such that the positive electrode non-coating portions 412b overlap each other, and then, the positive electrode tab 414 may be disposed on the positive electrode non-coating portion 412b of the positive electrodes 412, and the positive electrode tab 414 may be coupled with the positive electrode non-coating portion 412b to prepare the positive electrode assembly 410.

At this point, the positive electrode non-coating portion 412b may be coupled with the positive electrode 412 using any method provided that the positive electrode non-coating portion 412b may be mechanically coupled in a single body and simultaneously may be electrically connected, and, for example, the method may be one of ultrasonic welding, resistance welding, and riveting.

As illustrated in FIG. 13A, in the negative electrode assembly preparing operation, one or more negative electrodes 422, the negative electrode tab 424, and the unit separator 426 having a size equal to or greater than that of the negative electrode 422 are prepared. At this point, the negative electrodes 422 include the negative electrode non-coating portion 422b formed on the second end of at least one surface of the negative electrodes 422, and the negative electrode coating portions 422a formed by coating a region, except for the second end of the negative electrode non-coating portion 422b, with negative electrode active materials.

Then, as illustrated in FIG. 13B, one or more negative electrodes 422 are stacked, if two or more negative electrodes 422, they are stacked such that the negative electrode non-coating portions 422b overlap each other. At this point, when two or more negative electrodes 422 are provided, two unit separators 426 are stacked between the negative electrodes 422, if necessary, and one unit separator 426 may be stacked on each of the upper and lower portions of two negative electrodes 422 at the outermost sides, that is, one unit separator 426 may be disposed on each of both outermost sides of the negative electrode assembly 420, and then, the negative electrode tab 424 may be disposed on the negative electrode non-coating portion 422b of the negative electrode 422 and may be coupled to the negative electrode non-coating portion 422b of the negative electrode 422 to prepare the negative electrode assembly 420.

At this point, the negative electrode non-coating portion 422b may be coupled with the negative electrode 422 using any method provided that the negative electrode non-coating portion 422b may be mechanically coupled in a single body and simultaneously may be electrically connected, and, for example, the method may be one of ultrasonic welding, resistance welding, and riveting.

Subsequently, the positive electrode assembly 410 and the negative electrode assembly 420 are disposed to face each other, and then, the positive electrodes 412 of the positive electrode assembly 410 and the negative electrodes 422 of the negative electrode assembly 420 are inserted into each other to be alternately stacked, thereby completing the electrode assembly 400 according to the current embodiment. At this point, the positive electrodes 412 and the negative electrodes 422 are inserted such that the unit separator 426 may be disposed between the positive electrode 412 and the negative electrode 422. In addition, the positive electrode tab 414 and the negative electrode tab 424 are disposed on the upper or lower surface of the electrode assembly 400, not both side surfaces of the electrode assembly 400.

Figure 14:
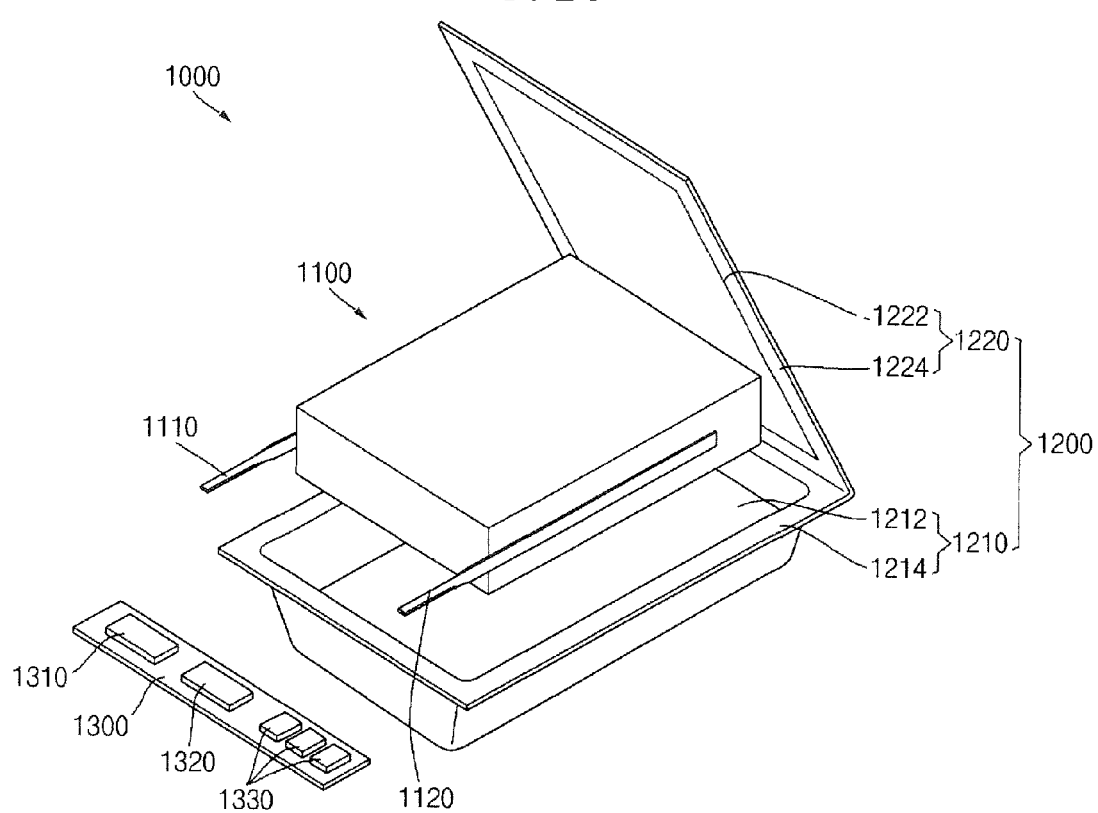
FIG. 14 is a perspective view illustrating a secondary battery including one of electrode assemblies according to embodiments.

FIG. 14 is a perspective view illustrating a secondary battery including one of electrode assemblies according to embodiments.

Referring to FIG. 14, a secondary battery 1000 including one of electrode assemblies according to embodiments includes an electrode assembly 1100. The electrode assembly 1100 may be one of the electrode assemblies 100, 200, 300, and 400 described with reference to FIGS. 1 through 13B. The electrode assembly 1100 includes a positive electrode tab 1110 and a negative electrode tab 1120, which may be respectively one of the positive electrode tabs 114, 214, 314, and 414 and one of the negative electrode tabs 124, 224, 324, and 424 described with reference to FIGS. 1 through 13B. Thus, a detailed drawing and a detailed description of the electrode assembly 1100 will be omitted.

The secondary battery 1000 includes a pouch 1200 receiving the electrode assembly 1100, and a protection circuit module 1300.

The pouch 1200 includes a main body 1210 and a cover 1220.

The main body 1210 includes a receiving part 1212 that is a space for receiving the electrode assembly 1100, and a sealing part 1214 that extends and expands from an entrance of the receiving part 1212.

The cover 1220 extends from an edge of the sealing part 1214 of the main body 1210. The cover 1220 entirely covers the receiving part 1212 of the main body 1210, and simultaneously seals the sealing part 1214 of the main body 1210, and thus, the cover 1220 includes a receiving part cover region 1222 corresponding to the receiving part 1212 of the main body 1210, and a sealing part 1224 corresponding to the sealing part 1214 of the main body 1210.

Thus, the secondary battery 1000 may be formed by putting the electrode assembly 1100 in the receiving part 1212 of the main body 1210, by closing the receiving part 1212 with the cover 1220, and by sealing the sealing part 1214 of the main body 1210 and the sealing part 1224 of the cover 1220 using a method such as heat welding.

After the pouch 1200 is sealed, the positive electrode tab 1110 and the negative electrode tab 1120 extend out of the electrode assembly 1100. The positive electrode tab 1110 and the negative electrode tab 1120 are connected to a protection circuit module 1300.

The protection circuit module 1300 controls charge and discharge of the electrode assembly 1100, and operation of the secondary battery 1000. The protection circuit module 1300 includes a control device 1310 such as an integrated circuit (IC) device, a secondary protection device 1320 that prevents an overcurrent from flowing into the secondary battery 1000, and external terminals 1330 that connect the secondary battery 1000 to an external device.

Figure 15:
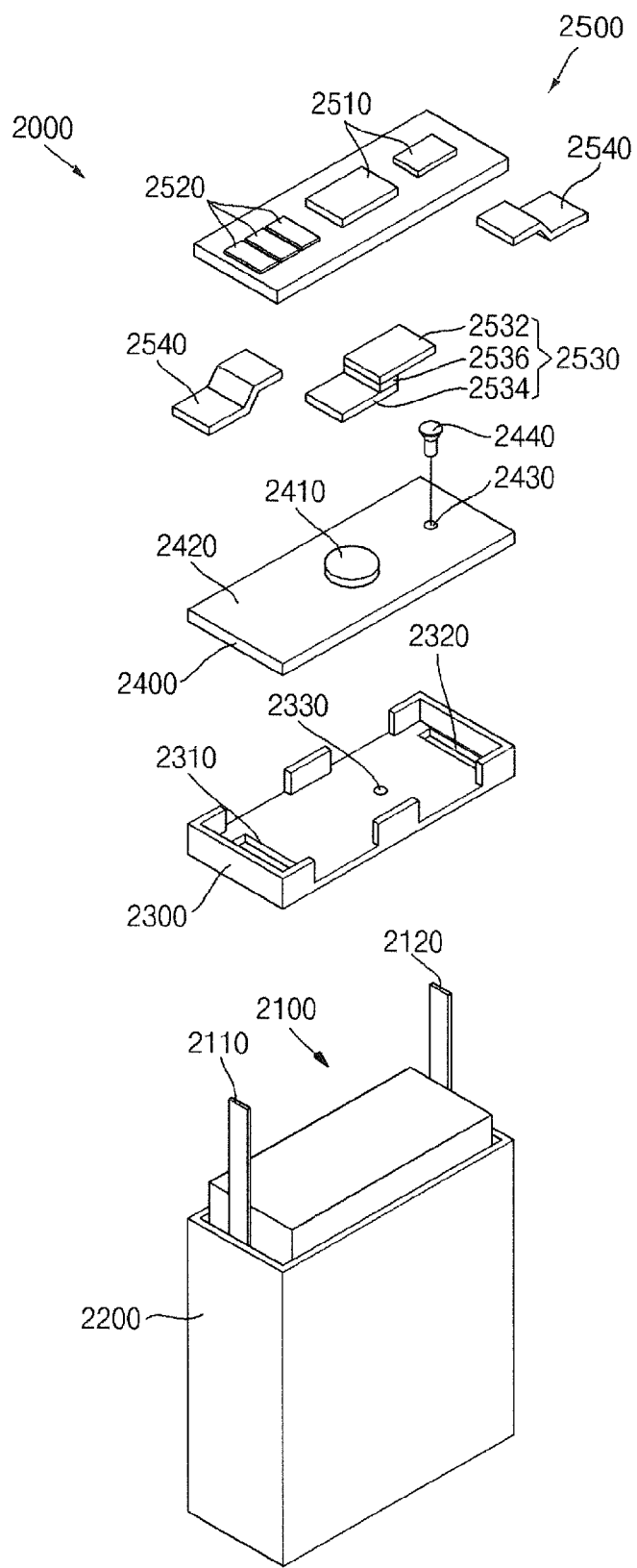
FIG. 15 is a perspective view illustrating a secondary battery including one of electrode assemblies according to embodiments.

FIG. 15 is a perspective view illustrating a secondary battery including one of electrode assemblies according to embodiments.

Referring to FIG. 15, a secondary battery 2000 including one of electrode assemblies according to embodiments includes an electrode assembly 2100. The electrode assembly 2100 may be one of the electrode assemblies 100, 200, 300, and 400 described with reference to FIG. 1 through 13B. The electrode assembly 2100 includes a positive electrode tab 2110 and a negative electrode tab 2120, which may be respectively one of the positive electrode tabs 114, 214, 314, and 414 and one of the negative electrode tabs 124, 224, 324, and 424 described with reference to FIG. 1 through 13B. Thus, a detailed drawing and a detailed description of the electrode assembly 2100 will be omitted.

In the secondary battery 2000, the electrode assembly 2100 may be stored in a can 2200 having an opening that may be open in a predetermined direction.

An insulating case 2300 may be inserted through the opening of the can 2200 receiving the electrode assembly 2100.

The insulating case 2300 prevents shaking of the electrode assembly 2100 in the can 2200, and insulates the space between the electrode assembly 2100 and a cap plate 2400 that will be described later.

The insulating case 2300 has a first through hole 2310 and a second through hole 2320 through which the positive electrode tab 2110 and the negative electrode tab 2120 respectively pass, and an electrolyte injection hole 2330 for injecting electrolyte.

The cap plate 2400 covers the opening of the can 2200 storing the electrode assembly 2100 to seal the can 2200.

The cap plate 2400 includes an electrode terminal 2410 at a predetermined position. The electrode terminal 2410 may be insulated from a plate terminal 2420 that may be out of the predetermined position of the cap plate 2400. The cap plate 2400 has an electrolyte injection hole 2430 at a predetermined position. The electrolyte injection hole 2430 may be a hole for injecting electrolyte. The electrolyte injection hole 2430 may be sealed with an injection hole plug 2440 when injection of electrolyte is completed.

The electrode terminal 2410 may be electrically connected to the positive electrode tab 2110 or the negative electrode tab 2120 of the electrode assembly 2100. The plate terminal 2420 may be electrically connected to the negative electrode tab 2120 or the positive electrode tab 2110.

The secondary battery 2000 includes a protection circuit module 2500 that controls charge/discharge and operation of the secondary battery 2000.

The protection circuit module 2500 includes a control device 2510 such as an integrated circuit (IC) device, and external terminals 2520 that connect the secondary battery 2000 to an external device.

The protection circuit module 2500 may be electrically connected to the electrode terminal 2410 and the plate terminal 2420.

A secondary protection device 2530 may be disposed between the protection circuit module 2500 and the electrode terminal 2410 to prevent an overcurrent from flowing into the secondary battery 2000.

The secondary protection device 2530 includes a first terminal lead 2582 connected to the electrode terminal 2410, a second terminal lead 2534 connected to the protection circuit module 2500, and a positive temperature coefficient device 2536 disposed between the first and second terminal leads 2532 and 2534.

The protection circuit module 2500 may be electrically connected to the plate terminal 2420.

The electrical connection between the protection circuit module 2500 and the plate terminal 2420 may be formed by connection members 2540. The connection members 2540 may be connected to the protection circuit module 2500 using a method such as soldering, and be connected to the plate terminal 2420 using a method such as soldering, laser welding, and resistance welding, or through a coupling member such as a bolt.

According to the embodiments, the electrode assembly can be easily assembled.

According to the embodiments, the electrode assembly can facilitate aligning.

According to the embodiments, the method of fabricating the electrode assembly is provided.

According to the embodiments, the secondary battery including the electrode assembly is provided.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. An electrode assembly comprising:
  a positive electrode assembly including a plurality of positive electrodes each having a positive electrode non-coating portion, and a positive electrode tab coupling all of the positive electrode non-coating portions;
  a negative electrode assembly including a plurality of negative electrodes each having a negative electrode non-coating portion, and a negative electrode tab coupling all of the negative electrode non-coating portions; and
  a separator disposed between each positive electrode and each negative electrode insulating a region between the positive electrode and the negative electrode, the positive electrodes of the positive electrode assembly and the negative electrodes of the negative electrode assembly being stacked alternately, and the separator being inserted in a zigzag manner by being bent 180 degrees to form a bend in a lateral direction of the positive electrode and the negative electrode, and surrounding both ends of the positive electrode and the negative electrode or both side surfaces of the positive electrode and the negative electrode, said side surfaces being parallel to a longitudinal center line of the positive and negative electrodes, wherein the positive electrodes each include a positive electrode coating portion coated with a positive electrode active material in a region except for another region where the positive electrode non-coating portion is located, the another region where the positive electrode non-coating portion is located between two adjacent regions where the positive electrode active material is located; and the negative electrodes each include a negative electrode coating portion coated with a negative electrode active material in a region except for another region where the negative electrode non-coating portion is located, the another region where the negative electrode non-coating portion is located between two adjacent regions where the negative electrode active material is located; and the separator covering at least the positive electrode coating portion or the negative electrode coating portion, at least one of the positive electrode and the negative electrode being bent 180 degrees to form a bend at the other region where the corresponding electrode non-coating portion is located, the bends of the at least one of the electrodes and the separator all running parallel to each other, the positive electrode tab being positioned on an exterior surface of the positive electrode assembly in direct physical contact with solely a single positive electrode non-coating portion of a single positive electrode of the plurality of positive electrodes, the negative electrode tab being positioned on an exterior surface of the negative electrode assembly in direct physical contact with solely a single negative electrode non-coating portion of a single negative electrode of the plurality of negative electrodes, and the positive electrode tab and the negative electrode tab being positioned on opposite sides of the electrode assembly.

2. An electrode assembly, comprising:

a positive electrode assembly including a plurality of positive electrodes each having a positive electrode non-coating portion, and a positive electrode tab coupling all the positive electrode non-coating portions;

a negative electrode assembly including a plurality of negative electrodes each having a negative electrode non-coating portion, and a negative electrode tab coupling all the negative electrode non-coating portions; and a separator disposed between each positive electrode and each negative electrode insulating a region between the positive electrode and the negative electrode, the positive electrodes of the positive electrode assembly and the negative electrodes of the negative electrode assembly being stacked alternately, and the separator is inserted in a zigzag manner by being bent 180 degrees in a lateral direction of the positive electrode and the negative electrode, and surrounds both ends of the positive electrode and the negative electrode or both side surfaces of the positive electrode and the negative electrode, said side surfaces being parallel to a longitudinal center line of the positive and negative electrodes, wherein the positive electrodes each includes a positive electrode coating portion coated with a positive electrode active material in a region except for another region where the positive electrode non-coating portion is located, the another region where the positive electrode non-coating portion is located between two adjacent regions where the positive electrode active material is located; and the negative electrodes each includes a negative electrode coating portion coated with a negative electrode active material in a region except for another region where the negative electrode non-coating portion is located, the another region where the negative electrode non-coating portion is located between two adjacent regions where the negative electrode active material is located; and the separator covering at least the positive electrode coating portion or the negative electrode coating portion, wherein the positive electrode is bent 180 degrees at the another region where the positive electrode non-coating portion is located, the negative electrode is bent 180 degrees at the another region where the negative electrode non-coating portion is located, the bendings of the positive, negative and the separator are all run parallel to each other, wherein the negative electrode tab is positioned on an exterior surface of the negative electrode assembly in direct physical contact with solely a single negative electrode non-coating portion of a single negative electrode of the plurality of negative electrodes, wherein the positive electrode tab is positioned on an exterior surface of the positive electrode assembly in direct physical contact with solely a single positive electrode non-coating portion of a single positive electrode of the plurality of positive electrodes, and wherein the negative electrode tab and the positive electrode tab are positioned on opposite sides of the electrode assembly.

3. The electrode assembly as claimed in claim 2, wherein the positive electrode non-coating portions are disposed in the middle of the positive electrode, and the negative electrode non-coating portions is disposed in the middle of the negative electrode.

4. The electrode assembly as claimed in claim 2, wherein the positive electrode assembly and the negative electrode assembly are folded respectively along the positive electrode non-coating portion and the negative electrode non-coating portion such that the positive electrode tab and the negative electrode tab are disposed on side surfaces.

5. The electrode assembly as claimed in claim 2, wherein the separator is formed to be coated entirely on at least the negative electrode coating portion.

6. The electrode assembly as claimed in claim 2, wherein the separator is formed to be a size that is equal to or greater than that of the negative electrode.

7. The electrode assembly as claimed in claim 6, wherein the separator is disposed at least in duplicate between the negative electrode and the negative electrode.

8. The electrode assembly as claimed in claim 2, wherein the separator is disposed at the negative electrode non-coating portion between the negative electrodes, and is coupled by the negative electrodes and integrally formed with the negative electrode assembly.

9. The electrode assembly as claimed in claim 2, wherein the positive electrode non-coating portions are coupled with the positive electrode tab using one of ultrasonic welding, resistance welding, and riveting, and the negative electrode non-coating portions are coupled with the negative electrode tab using one of ultrasonic welding, resistance welding, and riveting.

10. A secondary battery, comprising:
an electrode assembly;
an external member having a rectangular prism shape for receiving the electrode assembly; and
a protection circuit module to which a positive electrode tab and a negative electrode tab of the electrode assembly are electrically connected,
the electrode assembly comprising:
a positive electrode assembly including a plurality of positive electrodes each having a positive electrode non-coating portion, and the positive electrode tab coupling all the positive electrode non-coating portions;
a negative electrode assembly including a plurality of negative electrodes each having a negative electrode non-coating portion, and the negative electrode tab coupling all the negative electrode non-coating portions; and
a separator disposed between each positive electrode and each negative electrode to insulate a region between the positive electrode and the negative electrode,
the positive electrodes of the positive electrode assembly and the negative electrodes of the negative electrode assembly being stacked alternately, and the separator is inserted in a zigzag manner by being bent 180 degrees in a lateral direction of the positive electrode and the negative electrode, and surrounds both ends of the positive electrode and the negative electrode or both side surfaces of the positive electrode and the negative electrode, said side surfaces being parallel to a longitudinal center line of the positive and negative electrodes,
wherein the positive electrodes each includes a positive electrode coating portion coated with a positive electrode active material in a region except for another region where the positive electrode non-coating portion is located, the another region where the positive electrode non-coating portion is located between two adjacent regions where the positive electrode active material is located; and
the negative electrodes each includes a negative electrode coating portion coated with a negative electrode active material in a region except for another region where the negative electrode non-coating portion is located, the another region where the negative electrode non-coating portion is located between two adjacent regions where the negative electrode active material is located; and
the separator covering at least the positive electrode coating portion or the negative electrode coating portion,
wherein the positive electrode is bent 180 degrees at the another region where the positive electrode non-coating portion is located, the negative electrode is bent 180 degrees at the another region where the negative electrode non-coating portion is located, the bendings of the positive, negative and the separator are all run parallel to each other,
wherein the negative electrode tab consists of being positioned on an exterior surface of the negative electrode assembly in direct physical contact with solely a single negative electrode non-coating portion of a single negative electrode of the plurality of negative electrodes,
wherein the positive electrode tab consists of being positioned on an exterior surface of the positive electrode assembly in direct physical contact with solely a single positive electrode non-coating portion of a single positive electrode of the plurality of positive electrodes, and
wherein the negative electrode tab and the positive electrode tab are positioned on opposite sides of the electrode assembly and in direct physical contact with interior sides of the external member.

11. The secondary battery as claimed in claim 10, wherein the external member is a pouch comprising:
a main body having a receiving part receiving the electrode assembly; and
a cover covering the main body.

12. The secondary battery as claimed in claim 10, wherein the external member is a prismatic can, and the secondary battery further comprises a cap assembly comprising:
a cap plate sealing an opening of the prismatic can;
an electrode terminal insulated from the cap plate and passing through the cap plate;
a conductive plate electrically connected to the electrode terminal; and
an insulating plate insulating a region between the conductive plate and the cap plate.

* * * * *